350-321. OR 3551034 SR

Dec. 29, 1970 P. TOURNOIS ET AL 3,551,034

WAVE COMPRESSION DEVICE

Filed June 3, 1965 4 Sheets-Sheet 1

Dec. 29, 1970 P. TOURNOIS ET AL 3,551,034

WAVE COMPRESSION DEVICE

Filed June 3, 1965 4 Sheets-Sheet 3

United States Patent Office 3,551,034

Patented Dec. 29, 1970

3,551,034

WAVE COMPRESSION DEVICE

Pierre Tournois and François Gires, Paris, France, assignors to CSF-Compagnie Generale de Telegraphie Sans Fil, a corporation of France Filed June 3, 1965, Ser. No. 460,999
Claims priority, application France, June 5, 1964, 977,196
Int. Cl. G02b *5/00*; H03h *7/30*
U.S. Cl. 350—321 4 Claims

ABSTRACT OF THE DISCLOSURE

The present invention relates to systems for compressing frequency modulated pulse trains and more particularly to devices comprising a propagation medium bounded by at least one dispersive reflector arrangement having two parallel plane faces respectively partially and wholly reflecting. The dispersion action is obtained by directing a wave obliquely onto the partially reflecting face. The beam reflected from the reflector carries substantially the radiant energy of the incident beam, but shifted in time by an amount which is a function of the carrier frequency of said wave.

The present invention relates to wave compressing devices. More particularly, it is an object of the invention to provide a device capable of receiving signals in the form of trains of waves of a certain duration, which is large compared with the wave period, and of delivering a train of pulsed waves, of the same frequency, but of a much shorter duration.

Such devices are used in certain radar systems for example, in which for increasing the quantity of radiated energy while maintaining the peak power within acceptable limits, the duration of the wave train has been made longer than the out and return time of this train for a detectable echo.

For solving this problem, devices based on the use of heavy and bulky delay lines having lumped or distributed constants, have been proposed.

The invention provides a device for compressing frequency-modulated pulses having over known system the advantage of comprising a small number of cells, all other things being equal.

According to the invention there is provided a device for compressing frequency modulated pulse trains, comprising at least one transparent plate having two at least partly reflecting faces, means for directing a frequency modulated pulse train onto one of said faces obliquely with respect to one of said faces, and an output for collecting said wave after successive reflections on said faces.

For a better understanding of the invention reference will be made to the drawing accompanying the following description, and in which.

Figures 1, 5, 6:
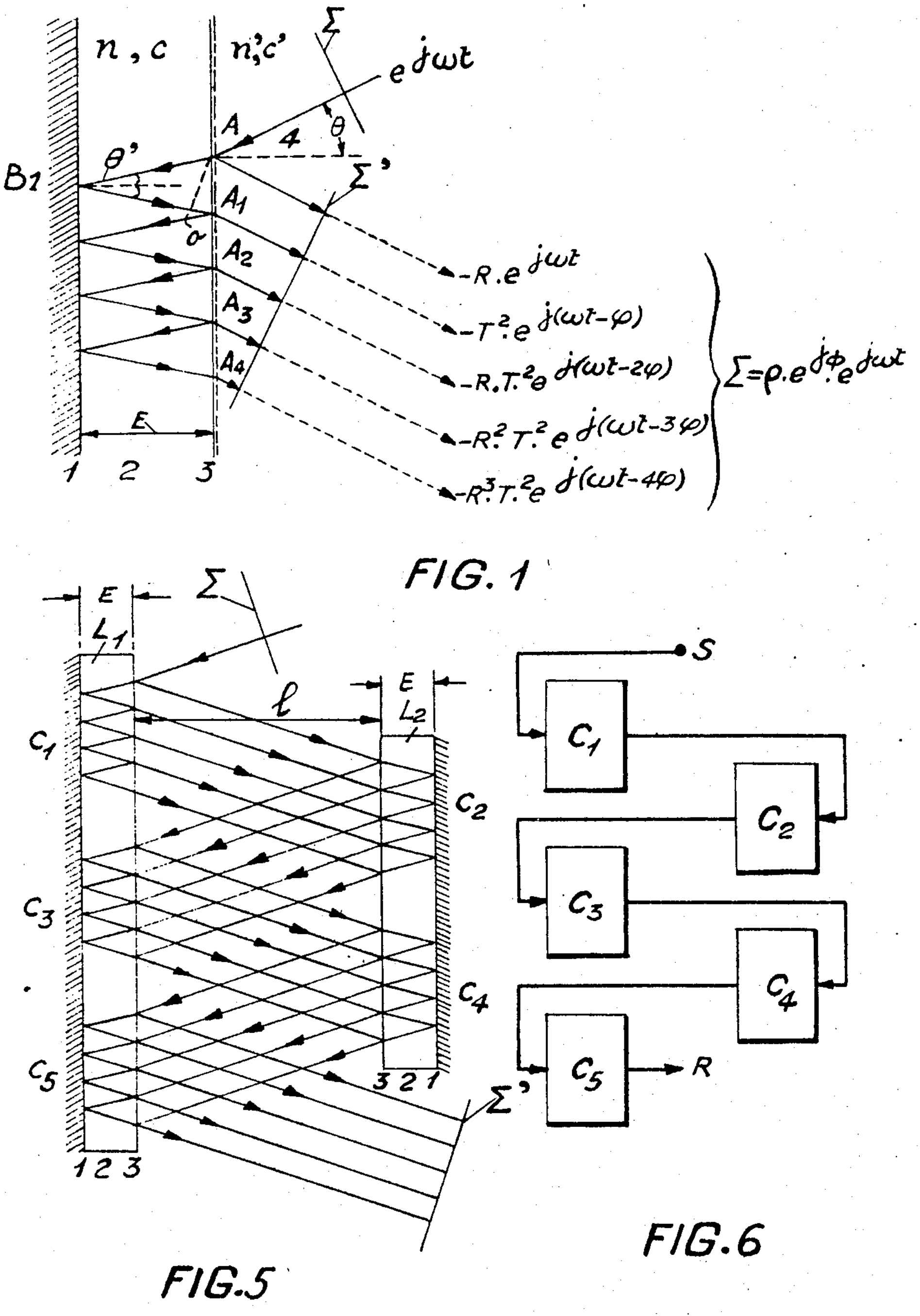
FIG. 1 is a diagrammatic view of the essential element of a system according to the invention.
FIG. 5 is a basic diagram of a system according to the invention.
FIGS. 6 to 9 represent diagrammatically different embodiments of the invention.

FIG. 1 is restricted to permanent operating conditions; it shows a transparent plate 2 having parallel faces, and bounded on one side by a perfectly reflecting mirror 1 and one the other side by a partly reflecting surface 3. The index of refraction of plate 2 and the velocity of the wave propagated therein are $n$ and $c$, respectively, and $n'$ and $c'$ are, respectively, the index and the velocity of the wave in the medium 4, to the right of plate 2.

Let a ray of light be propagated in the medium 4 and let it arrive with an incidence $\theta$, this ray corresponding to a plane wave surface, nature of the wave not being specified, it being understood that the reasoning is valid, regardless of this nature. Let A be the point of incidence of this ray and $e^{j\omega t}$ the complex exponential or cissoidal vibration of the wave at the point A. A part of said wave passes at A from medium 4 to medium 2, and its cissoidal equation at A is $-Re^{j\omega t}$, R being the coefficient of reflection in terms of amplitude on face 3.

The refracted part is totally reflected at $B_1$ by wall 1, where it arrives with an incidence $\theta'$. As it reaches point $A_1$ on wall 3 a part of the energy is refracted into medium 4. The remaining part is reflected by surface 3 towards surface 1.

The cissoidal equation of the wave refracted at $A_1$ may be written:

$$T^2e^{j(\omega t-\phi)}$$

$\varphi$ being the phase corresponding to the path A $B_1$ $A_1$, T being the coefficient of transmission of face 3, in terms of amplitude and T and R being connected by the relation $$T^2+R^2=1 \quad (1)$$

In calculating $\varphi$, it may be remarked that within plate 2, the reflected equiphase wave surface passing through A is the perpendicular A$a$ dropped from A, to $B_1$ $A_1$: $\varphi$ is the phase difference introduced by the path $AB_1a$, that is to say, E being the thickness of plate 2, $$\varphi=\frac{2\pi}{\lambda}(AB_1+B_1a)=\frac{2}{\lambda}\left(\frac{E}{\cos\theta'}+\frac{E\cos 2\theta'}{\cos\theta'}\right)$$

$$=2E\cos\theta'\frac{\omega}{c}$$

whence $$\varphi=\frac{2\omega}{c}E\cos\theta' \quad (2)$$

which may be written $$\varphi=\omega t_0 \quad (3)$$

with $$t_0=\frac{2E\cos\theta'}{c} \quad (4)$$

$t_0$ being the delay time of the wave for one to-and-fro passage.

Thus the refracted waves points at A to $A_n$ are:

at A: $-Re^{j\omega t}$
at $A_1$: $+T^2e^{j\omega t}$
at $A_2$: $+RT^2e^{j(\omega t-2\phi)}$
at $A_3$: $+R^2T^2e^{j(\omega t-3\phi)}$
at $A_n$: $+R^{n-1}T^2e^{j(\omega t-n\phi)}$ The rays issuing from points A to $A_n$ are parallel and form a plane wave. The resultant cissoidal wave is:

$$\sum=[-R+T^2e^{-j\phi}+RT^2e^{-2j\phi}+T^2R^ne^{-(n+1)j\phi}]e^{j\omega t}$$

which, after a simple calculation, may be written, $$\Sigma=\rho e^{j\phi}e^{j\omega t} \quad (5)$$

with $$\tan\frac{\varphi}{2}=\frac{1-R}{1+R}\tan\frac{\Phi}{2} \quad (6)$$

and $\rho=1$.

These equations establish the phase of the resultant wave with respect to the incident wave at A. The resultant wave has the same amplitude as the incident wave.

It follows from the foregoing that the phase shift $\Phi$, which is a function of $\varphi$, is a function of the frequency of the incident wave (relations 3 and 4).

Consequently, plate 2 causes a delay, which is a function of the wavelength of the incident wave.

If the incident wave is a frequency-modulated, pulsed wave train, a system such as that described will provide at its output a pulsed wave train of shorter duration, as may be readily shown by means of a somewhat simple field reasoning.

Figure 2:
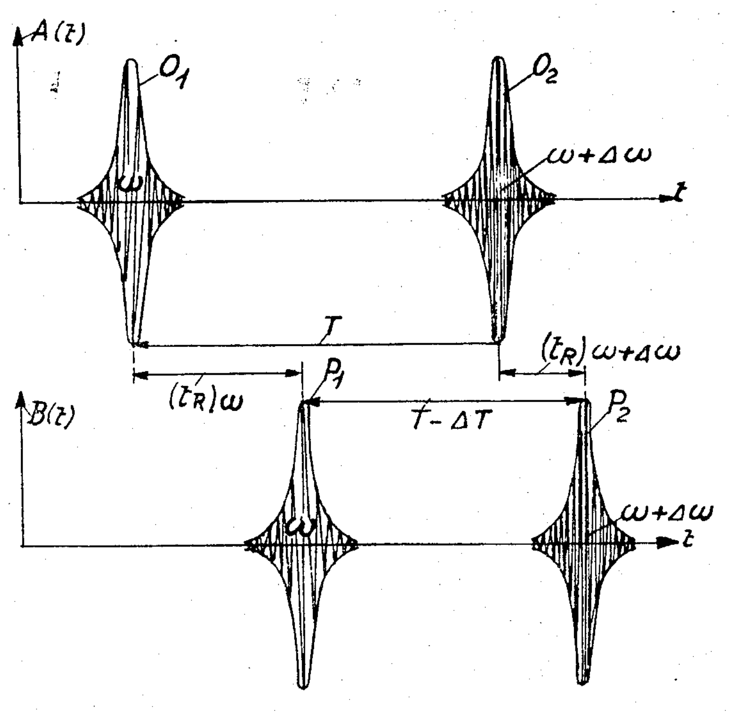
FIG. 2 shows explanatory curves.
Figure 3:
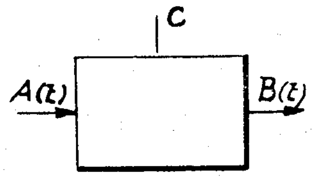
FIG. 3 is an explanatory circuit diagram.

Let, for example, two pulsed wave trains as shown in FIG. 2 of the same duration $O_1$ and $O_2$ and with the respective angular frequencies $\omega$ and $\varphi+\Delta\omega$ be assumed to reach a dispersive delay arrangement such as that of FIG. 1 which upon receiving at the input signal $A(t)$, built up by the two trains $O_1$ and $O_2$, delivers at output signal $B(t)$, built up by the two trains $P_1$ and $P_2$.

The cell being dispersive, the first train is delayed by a time interval $t_R(\omega)$ and the second by a time interval $t_R(\omega+\Delta\omega)$ in relation to the original trains. The delay between trains $O_1$ and $O_2$ is equal to T. That of the trains $P_1$ and $P_2$ is only $T-\Delta T$. If a number of dispersive arrangements or cells of this type are placed one after the other, the two trains will finally become confused, a pulse compression being thus achieved.

Figure 10:
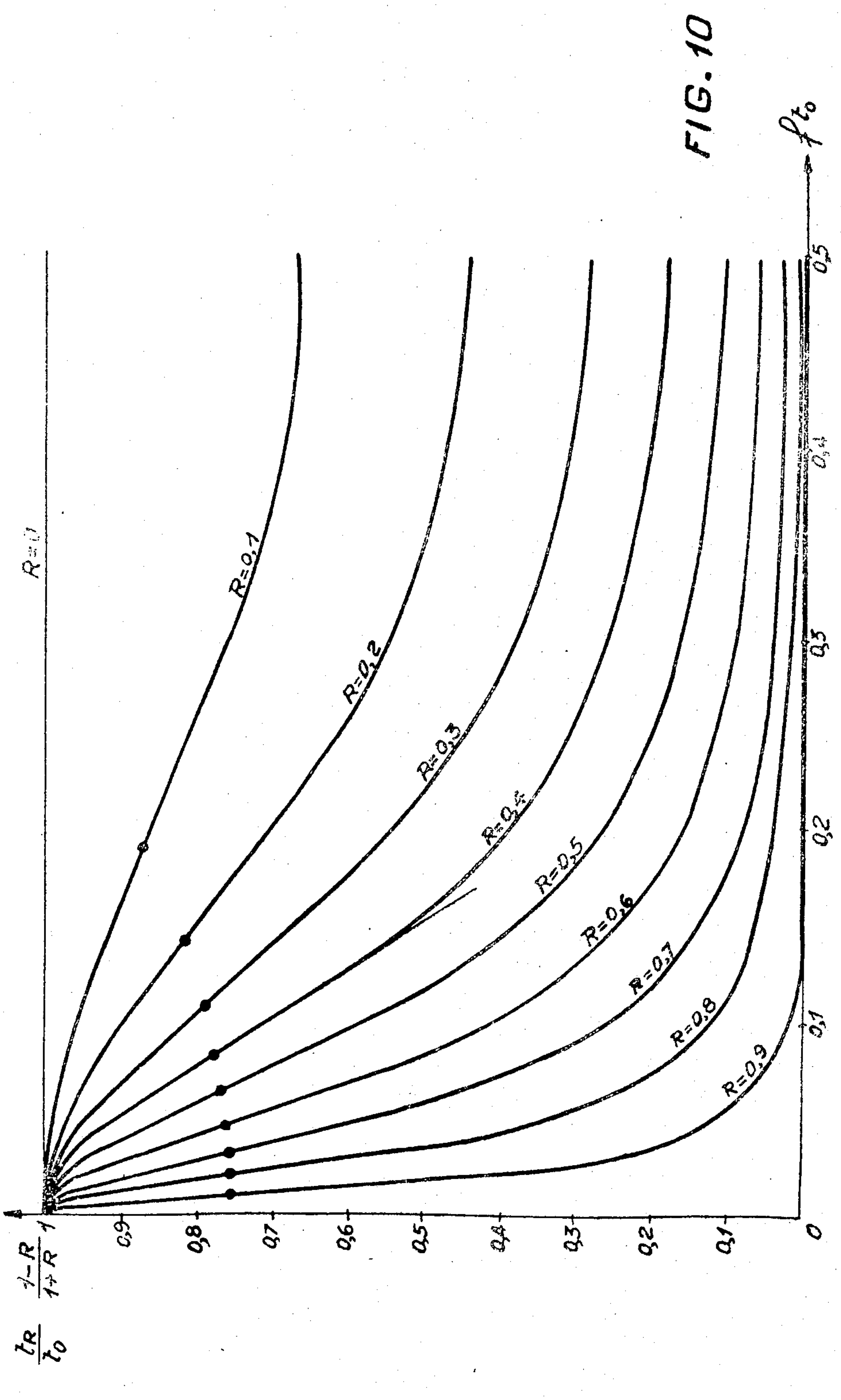
FIG. 10 shows an explanatory curve.

The figure of merit of a dispersive cell is obtained by measuring the intervals $\Delta T_R$ and $\Delta\omega$ which, on a curve of $t_R$ plotted as a function of $\omega$, enclose an area of substantially linear variation; it then remains to determine the product $\Delta\omega\Delta t_R$, or, what comes to the same thing, $\Delta f\Delta t_R$, to obtain the said figure of merit. This dimensionless number characterises in the aggregate the dispersive performances, since it is proportional to the bandwidth of the cell and to the time displacement associated with the latter. FIG. 10 shows the family of characteristic curves relating to the cell of FIG. 1; the figure of merit evaluated according to these curves is as much as 0.6, whereas it is only 0.04 in conventional delay cells. In other words, where fifteen cells were necessary, only a single cell according to the invention will suffice.

Figure 4:
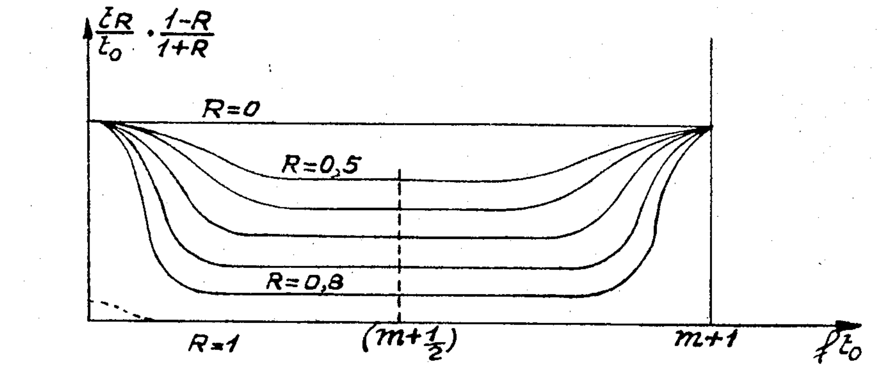
FIG. 4 shows a working curve.

FIG. 4, for several values of $0.5<R<1$, shows the variations of the parameter $$\frac{tR}{t_o}\,\frac{1-R}{1+R}$$

as a function of $$ft_o=\frac{\omega}{2\pi}\,t_o$$

the curves being obtained for increasing values of R as indicated.

It will be seen that the curves obtained have a period of $$1,\ \frac{1-R}{1+R}\,\frac{t_R}{t_o}$$

which may be written $$\frac{1}{1+\frac{4R}{(1-R)^2}\sin^2\left(\frac{\omega t_0}{2}\right)}=\frac{1-R}{1+R}\,\frac{t_R}{t_0}=\frac{1-R^2}{1+R^2-2R\cos\omega t_0}$$

The dotted line curve would be that obtained by a conventional cell.

The figure of merit is a maximum in a large area of variations of R between 0.5 and 1. For $R=0$ and $R=1$, there are no multiple reflections.

The invention may have various applications:

1ST APPLICATION

Compression of a frequency-modulated coherent light pulse.

It is known that such pulses may be produced by means of stimulated omission light sources of the type known in the art as pulsed "lasers."

FIG. 5 shows diagrammatically an arrangement according to the invention. The diagram is valid, whatever the nature of the pulses to be compressed.

The successive delay cells are obtained by means of two parallel and identical plates $L_1$ and $L_2$ of thickness E, situated at the distance $l$ from each other. The coherent wave is reflected successively at the two plates $L_1$ and $L_2$. FIG. 6 represents the equivalent circuit diagram. The delay cells $C_1$ to $C_5$ represent the portions of plates $L_1$ and $L_2$ on which the beam of light is successive by reflection. To prevent overlapping of the beams, the inequality $$l\geq k\,\frac{n}{n'}\cdot E$$

must be satisfied, $k$ being the number of successive reflections for $\rho$ to be substantially equal to unity.

Figure 7:
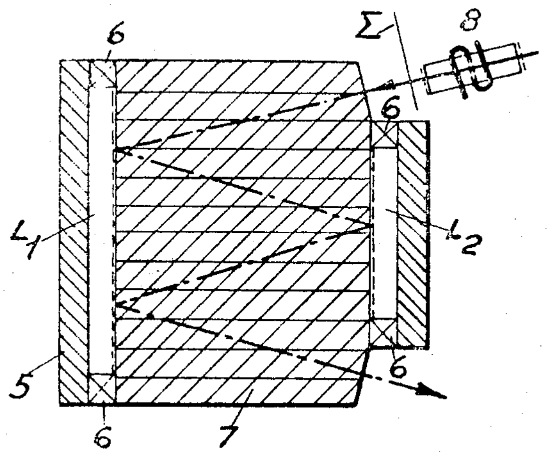

FIG. 7 represents an embodiment in which the source is a pulsed laser 8.

A glass block, by means of distance pieces 6, carries mirrors 5, ensuring the reflections. Layers of air $L_1$ and $L_2$ are thus formed and partial reflection occurs at the air-glass separation surface. It is known that the laser emits coherent light, that is to say, the phase of the wave at the input of the device is entirely defined. It is therefore possible to obtain pulse compression at the output, contrary to what occurs with non coherent light, which is the case for sources other than lasers. Furthermore, the frequency of the pulsed wave emitted by a triggered laser varies, naturally of according to an imposed law.

2ND APPLICATION

Compression of a pulsed sound wave

Figure 8:
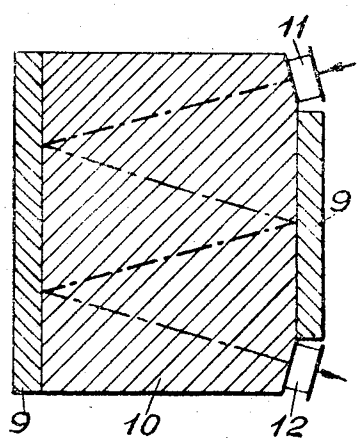

The device shown in FIG. 8 comprises a body 10 of a first metal of specific mass $\rho_1$, in which the velocity of a sound wave is $c_1$. This body is in the form of a rectangular parallelepiped; two plates 9, having the respective characteristics $\rho_2$ and $c_2$ are deposited on its two terminal faces.

A first transducer 11 is applied to the body 10, and a second transducer 12 receives the waves retransmitted by body 10; the whole is surrounded by air.

The system operates as follows. The wave emitted by transducer 11 is partly reflected by the separation surfaces 9 and 10, on the one hand, and 10 and 9 on the other, and completely reflected by the separation surfaces air-plate 9. The system operates with respect to sound waves, as the preceding systems with regard to luminous waves. If a vibration of a frequency variable as a function of time, is applied, compressed pulses are obtained.

Figure 9:
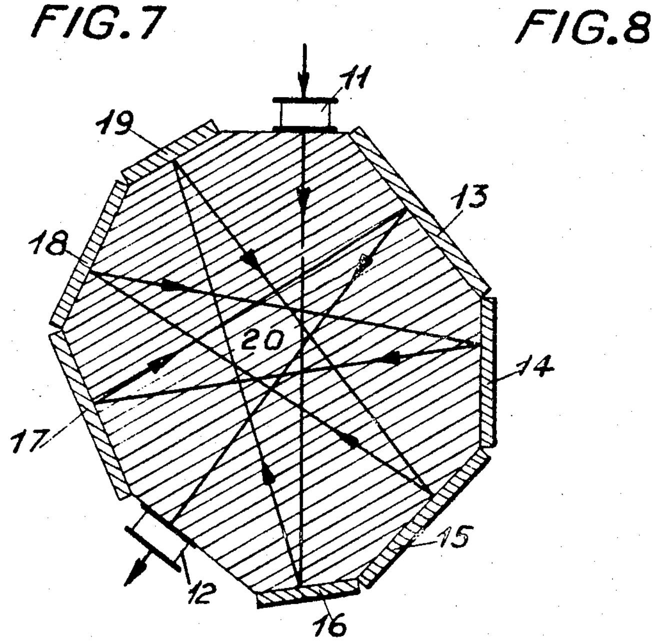

FIG. 9 shows a modification of the device of FIG. 8. A body 20 has the shape of a right prism and is made of a first metal of characteristics $\rho_1$ and $c_1$. Its lateral faces are covered by plates 13 to 19 of a second metal having characteristics $\rho_2$ and $c_2$. The transducers 11 and 12 are placed directly on the body 20.

The path of the sound rays (the multiple reflections not being shown for the sake of clarity) is shown in solid lines. The diagram is obviously equivalent to that of FIG. 8.

Of course, the invention is not limited to the embodiments described which have been given solely by way of example.

What is claimed is:

1. A device for compressing frequency modulated pulsed trains of light comprising at least one transparent plate having two parallel faces one of said faces being partly reflecting and said other face being wholly reflecting, a coherent triggered source of light for directing a frequency modulated pulse train onto said partially reflecting face obliquely with respect to said plate, and an output for collecting the whole energy of said wave after successive reflections on said faces.

2. A device for compressing a train of frequency modulated plane waves of light comprising: a glass block having two parallel faces, two wholly reflecting walls defining with said faces respective air filled cavities along said faces; means for directing frequency modulated pulsed waves of coherent light obliquely to one of said faces; said block having an input for receiving said beam and an output for collecting said beam after successive reflections on said faces and said walls.

3. A device for compressing frequency modulated pulsed train of sonic plane waves, comprising: a body of a first material, having at least two parallel faces; said body carrying two plates made of a second material respectively deposited along said faces; a first transducer, for radiating said frequency modulated waves within said body obliquely to one of said faces; and a second transducer coupled to said body for collecting the whole energy of said waves upon a plurality of successive reflections on said faces.

4. A device for compressing a frequency modulated pulsed train of sonic waves comprising a prismatic body of a first material, having a plurality of faces; a plurality of plates of a second material respectively extending along each of said faces except two faces a first transducer along one of said two faces for directing said frequency modulated pulsed waves obliquely with respect to one of said first mentioned faces; and a second transducer along the other of said two faces for collecting the whole energy of said waves after successive reflections on said first mentioned faces.

References Cited

UNITED STATES PATENTS

| | | | |
|---|---|---|---|
| 3,300,739 | 1/1967 | Mortley | 333—30 |
| 3,387,233 | 6/1968 | Parker | 333—30 |
| 3,282,148 | 11/1966 | Yamada | 88—14(I) |

OTHER REFERENCES

Mohler, N. M.: American Journal of Physics, "Optical Filters," vol. 20, No. 9, December 1952, pp. 583–588, 350–166.

DAVID SCHONBERG, Primary Examiner

T. H. KUSMER, Assistant Examiner

U.S. Cl. X.R.

333—30